United States Patent [19]
Riley

[11] Patent Number: 5,992,716
[45] Date of Patent: Nov. 30, 1999

[54] TOOL SECUREMENT DEVICE

[76] Inventor: Randolph S Riley, Box 2606, Seabrook, N.H. 03874

[21] Appl. No.: 08/874,943

[22] Filed: Jun. 13, 1997

[30] Foreign Application Priority Data

Apr. 11, 1997 [CA] Canada ................................... 2202451

[51] Int. Cl.⁶ ..................................................... A45F 5/00
[52] U.S. Cl. ......................... 224/251; 224/197; 224/242; 224/250; 224/249; 224/904
[58] Field of Search ..................................... 224/904, 191, 224/197, 242, 245, 246, 247, 248, 249, 250, 251, 254, 255, 222, 272; D3/228; 24/16 R, 16 PB

[56] References Cited

U.S. PATENT DOCUMENTS

| 160,432 | 3/1875 | Holabird et al. ...................... 224/251 X |
| 3,369,723 | 2/1968 | Saari et al. ........................... 224/250 X |
| 3,653,565 | 4/1972 | McAusland .......................... 224/250 X |
| 3,913,179 | 10/1975 | Rhee ..................................... 24/16 PB |
| 4,020,985 | 5/1977 | Halterman ............................... 224/251 |
| 4,106,679 | 8/1978 | Hillinger .................................. 224/197 |
| 4,112,988 | 9/1978 | Nelson ............................... 24/16 PB X |
| 4,631,783 | 12/1986 | Hayashi ................................. 24/16 PB |
| 4,645,104 | 2/1987 | Vokaty ................................ 224/904 X |
| 4,974,762 | 12/1990 | Boretsky et al. .................... 224/222 X |
| 5,024,402 | 6/1991 | Hamel ............................... 24/16 PB X |
| 5,450,993 | 9/1995 | Guerrero et al. ........................ 224/246 |
| 5,489,051 | 2/1996 | Robinson ............................ 224/249 X |
| 5,540,368 | 7/1996 | Olivia ...................................... 224/271 |
| 5,692,268 | 12/1997 | Case .................................... 224/420 X |

Primary Examiner—Gregory M. Vidovich
Attorney, Agent, or Firm—Randolph S. Riley

[57] ABSTRACT

Disclosed is a releasable device for holding a tool in a holder, the tool for example being a hammer held in a hammer holder commonly used in the construction industry and having a loop loosely holding the hammer. The device is of flexible, stretchable material and has an aperture which may be pulled over a portion of the tool such as the hammer head to hold the tool to the holder. The device is secure to the loop of the hammer holder. Preferably, the device is a strip of flexible stretched material with an aperture and a series of holes and slits which permit the strap to be able to be looped around the hammer holder loop. The loop is releasably secured to a portion of the tool such as the head of the hammer.

6 Claims, 2 Drawing Sheets

TOOL SECUREMENT DEVICE

FIELD OF THE INVENTION

The invention relates to a securement device to safely hold or clamp a tool in association with a tool holder or utility belt or apron.

BACKGROUND OF THE INVENTION

Many users of hand tools and particularly professional tradesmen, have tool belts, pouches or belt attachments that have leather or metal loops for holding a tool. Carpenters, for example, use tool belts that have a ring or loop protruding outwardly of the belt and through which the handle of a hammer or like tool is inserted. The head of the hammer rests on the ring or loop. Moving around a work site often can cause the hammer to fall out of the ring or loop.

Accordingly there is a need for a simple device which will lock or assist in releasably holding a tool in association with a loop or ring on a utility belt or the like.

SUMMARY OF THE INVENTION

The invention seeks to provide a tool holder that cooperates with a first loop, usually in a belt, through which the tool is loosely inserted and a second flexible loop coupled to the first loop for contacting the tool or at least a part of the tool and releasably holding the tool in the first loop. The second loop preferably includes a stretchable material or is otherwise expandable so that the second loop clamps or holds a portion of the hand tool to retain it in the first loop. This invention is particularly useful with hammers, including claw hammers, ballpeen hammers or mason's hammers. In this case, the second loop is preferably designed so that it is sufficiently large and elastic to fit over a portion of the hammer head. The second loop thus helps prevent the tool from inadvertently falling out of the first loop.

The device and in particular the second loop can be used for clamping other tools, such as a wrench or a square.

The invention provides an article of manufacture for use in securing a tool in a belt associated tool holder having means for holding a working tool when not in use. The article comprises a flexible expandable piece of material having opposed first and second ends, front and back faces and opposed side edges, the piece of material having a portion with an aperture therethrough. The aperture has a diameter which is less than a diametric extent of a portion of a tool in association with which the article is used for the tool's securement. The piece has means for securing the article to the holder adjacent the means for holding the working tool, whereby the piece may be stretched and manipulated so as to pull the aperture over the tool portion.

The invention further provides an article of manufacture for use with a belt associated tool holder, the tool holder having a tool holding ring which loosely holds a tool and the article of manufacture is connectable to the tool holder for further securement of a tool in the tool holder means. The article comprises a flexibly, expandable piece of material having opposed first and second ends, front and back faces and opposite side edges, the piece of material having a portion with an aperture therethrough and a slot located inwardly of both the side edges and spaced longitudinally between the aperture and the first end. The piece of material can be attached to the tool holding ring by wrapping the piece of material about the ring means and forcing the second end through the slit and pulling the second end and the apertured portion of the piece through the slit.

The invention also provides a tool holder having a front face and means for detachably securing the holder to a belt worn by a user. A first holding element is associated with the front face and extends outwardly therefrom, the first holding element adapted for cooperating with a portion of a tool for holding the tool. A second holding element has a portion connected with the first holding element, the second holding element having an aperture therein. The material of the second holding element about the aperture being flexible and expandable, whereby the aperture of the second holding element may be selectively stretched and pulled over a portion of a tool located in the first holding element to further secure the tool in the first holding element.

BRIEF DESCRIPTION OF THE DRAWINGS

Other features and advantages will be apparent from the following description of preferred embodiments when read in conjunction with the following drawings in which.

DESCRIPTION OF A PREFERRED EMBODIMENT

Figure 1:
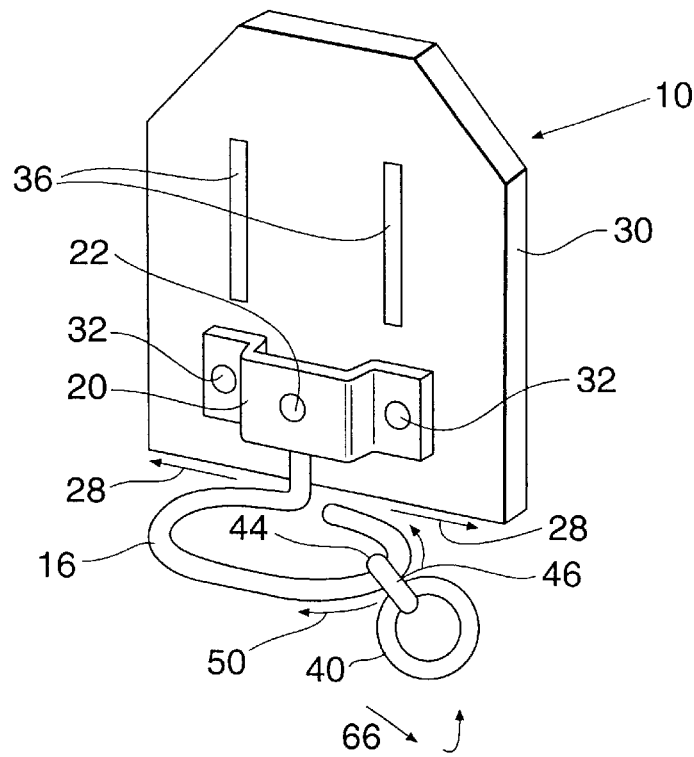
FIG. 1 is a front perspective view of a tool holder according to the invention.
Figure 2:
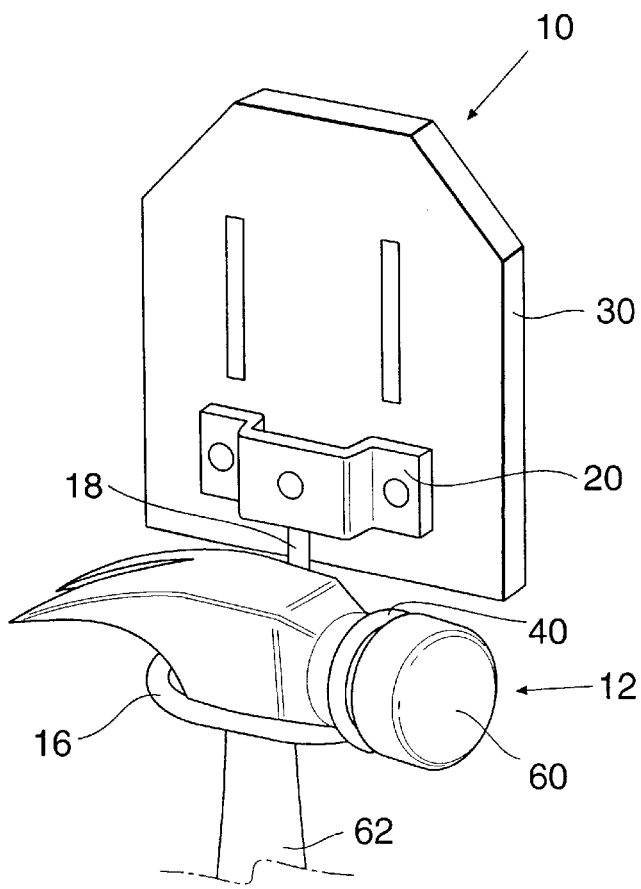
FIG. 2 is a view similar to FIG. 1 showing a hammer associated with the tool holder.
Figure 3:
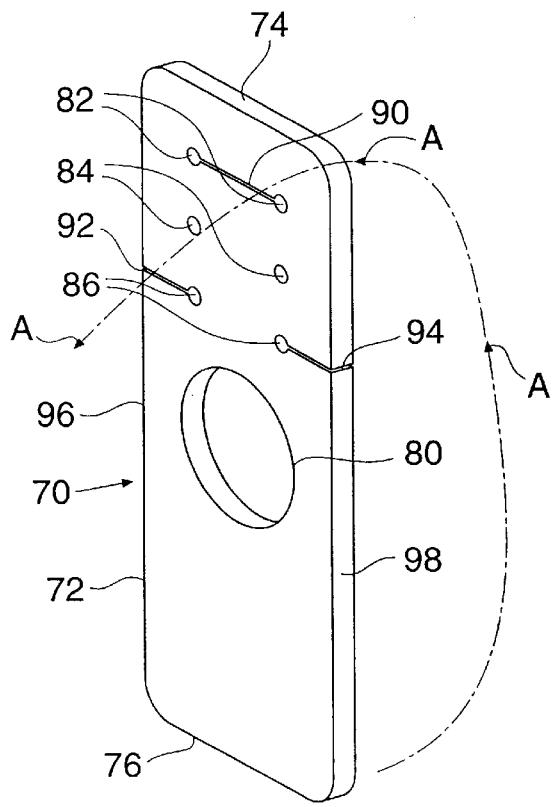
FIG. 3 is a front perspective of a particularly preferred loop.

Referring to FIGS. 1 and 2, a tool holder 10 is shown, a hammer 12 being shown held in tool holder 10 in FIG. 2. Tool holder 10 includes a first loop 16 that is generally in a horizontal plane (when the holder 10 is worn on a belt) and a vertical portion 18 extending up from the first loop to an offset support 20. First loop 16 is partially rotatably connected to the support 20 by rivet 22 for limited movement as indicated by arrows 28. The support 20 is attached to a leather backing 30 through rivets 32 and backing 30 has slits 36 for receiving a belt (not shown). A holder 10 of a type including loop 16, portion 18, support 20 and backing 30 is commercially available as Model R-739 under the brand name Rooster Products.

According to the present invention as shown in FIG. 1, on one side of loop 16, a second loop 40 is held or secured to the first loop 16 with a connector 44. Connector 44 can include one or more pieces of wire, or preferably as shown, includes a single strip of metal 46 wrapped around both loops and pressed or crimped securely so that the second loop 40 stays coupled to the first loop 16. However connector 44 allows for some horizontal movement around the first loop as indicated by arrow 50.

Second loop 40 is preferably made from a stretchable material, such as a braided elastic material, so that it snugly clamps or holds a portion of a tool. A variety of materials can be used for loop 40 including a portion of a bungee cord or some other synthetic braid, such as a loop designed to hold hair in a pony tail. Second loop 40 can be designed to have a variably adjustable radius, that is, expanded so that the loop can be wrapped around a portion of the tool, then reduced for clamping. This can be effected by a split loop 40 with VELCRO® fastening means on the opposite ends of the split loop. In one representative embodiment, loop 40 has an inside diameter of about 1 inch, an outer diameter of about 1.4 inches and a fully stretched length of about 3 inches.

As shown in FIG. 2, loop 40 is sufficiently large and has sufficient flexibility or expandability so that it can be brought up and over a portion of a tool, e.g. over a hammer head end 60 of a hammer 12. In such position, loop 40 holds the hammer 12 in place in first loop 16. Thus after the hammer handle 62 is inserted through the first loop 16 so that it is loosely held in loop 16, second loop 40 is stretched out in a direction of arrow 66, (FIG. 1), then pulled—rotated—so loop 40 is pulled over head 60. Thus, second loop 40 releasably secures hammer 12 to first loop 16 but hammer 12 can easily be removed from loop 16 by first pulling loop 40 off hammer head end 60.

A particularly preferred form of tool connector or second loop device is shown in FIGS. 3 through 6. This device 70 comprises an elongate strap or piece of material 72 having upper and lower ends 74, 76 and a hole or aperture 80 approximately centered between ends 74, 76. Three sets of paired holes, namely 82, 84 and 86 are substantially evenly spaced between aperture 80 and end 74. Holes 84 permit riveting strap 72 to a tool holding device if preferred in an alternative embodiment. With respect to the set of small holes 82, there is a slit or slot 90 extending between them, whereas with respect to the set of the small holes 86, there are slits 92, 94 respectively extending outwardly from the respective holes to the respective adjacent side edges 96 and 98 of the device. Preferably one of each of the holes 82, 84 and 86 are longitudinally in line with each other which line is tangent to an associated side of aperture 80. Holes 82 with intermediate slot 90 and holes 82 with outwardly extending, cooperating slits 92, 94 permit strap 72 to be detachably secured to a first loop of a tool holder, such as loop 100 of FIGS. 4, 5 and 6, which loop 100 is like loop 16 in FIGS. 1 and 2.

Figure 4:
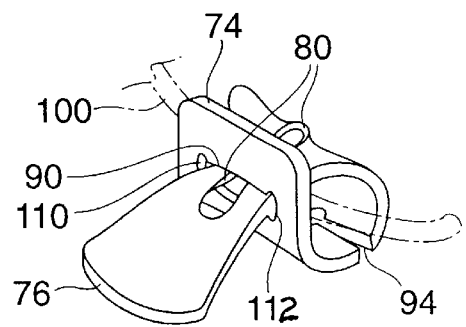
FIG. 4 shows connecting partial securement of the loop connector of FIG. 4 to a ring member.
Figure 5:
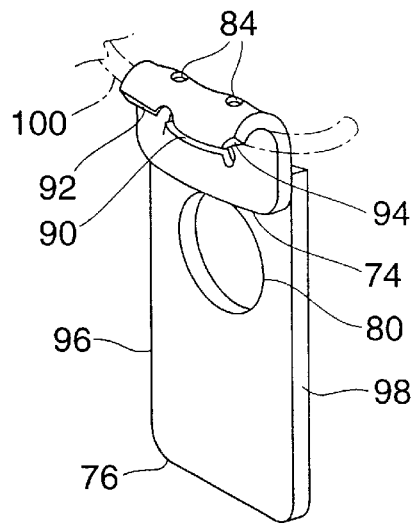
FIG. 5 shows a complete securement of the loop connector of FIG. 4 to a wing member.

Turning to FIGS. 4 and 5, strap 72 is attached to ring or loop 100 (shown in dotted lines) of a tool holder like that in FIGS. 1 and 2. Assuming loop 100 is placed behind strap 72 in FIG. 3, end 76 of strap 72 is turned rearwardly, upward around loop 100, (see arrows A in FIG. 3). Then end 76, which curls as shown in FIG. 4, is forced through slot 90. End 76 is pulled through slot 90 until the opposed edges 96, 98 of strap 72 at points 110, 112 adjacent hole sets 82 meet slits 92 and 94 to assume a position shown in FIG. 5. Device 70 is detachably secured to loop 100 and ready to hold or secure a portion of a tool. Slits 92 and 94 and the material adjacent thereto effectively provide locking means in cooperation with the material outwardly adjacent slot 90.

Figure 6:
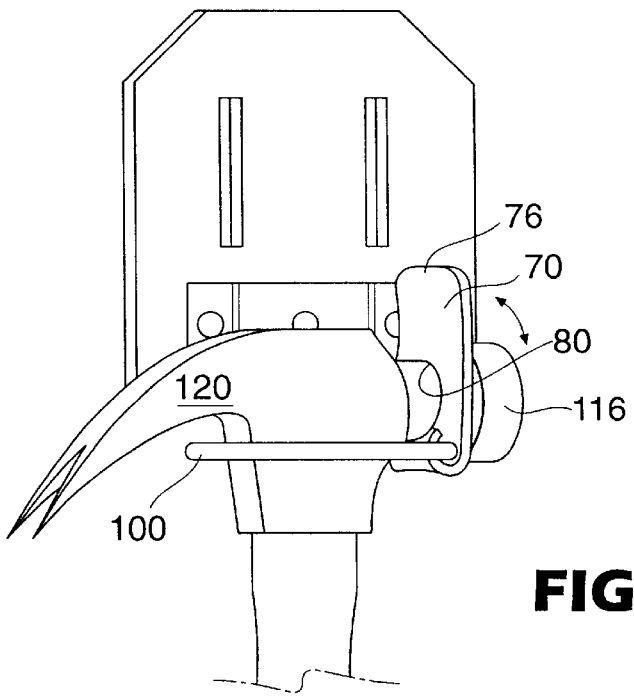
FIG. 6 shows the loop connector in association with a hammer member in a ring member.

FIG. 6 shows a hammer 120 in loop 100 with aperture 80 pulled over head 116. When hammer 120 is placed in loop 100, end 76 of strip 70 is pulled outwardly and upwardly over head 116, aperture 80 stretching as necessary.

Strap 70 is made of resilient, flexible material that can be stretched and manipulated in order to provide a lock or securement means for holding the tool such as a hammer in loop 100. Material such as rubber, neoprene or the like is preferred.

In an alternative aspect, it will be appreciated that if a tool holder is leather or does not include a loop-like loop 100, the inventive device itself can be riveted through holes 84 directly to the holder, (not shown), adjacent the first opening in the holder where the tool is inserted. Aperture 80 is pulled over some portion of the tool such as the handle of a screwdriver. The material around the aperture 80 will stretch and then naturally shrink about the tool portion.

Accordingly I have provided a securement or lock device for use with a loop of a tool holder which will securely hold the tool in the loop regardless of the movement of the user, whether climbing ladders or bending over.

The preferred embodiment is a simple one-piece device which can be attached and detached easily to the loop of a holder and yet has flexibility and stretchable that provides secure holding of the tool to the loop. It will be apparent that other shapes of aperture 80 may be chosen to be configured to suit the particular tool or a portion thereof and provide a snug fit when associated with the tool or a portion of a tool.

The embodiments of the invention in which an exclusive property or privilege is claimed are defined as follows:

1. A tool holder having a front face and
   means for detachably securing said holder to a belt worn by a user;
   first holding means associated with said front face and extending outwardly therefrom, said first holding means having means for cooperating with a portion of a tool for holding the tool;
   a second holding means having a portion connected with said first holding means, said second holding means having an aperture therein and material of said second holding means about said aperture being flexible and expandable, whereby the aperture of said second holding means being selectively stretched and pulled over a portion of a tool located in said first holding means to further secure said tool in said first holding means;
   said means for securing said holder to a belt including a slitted portion for association with said belt and said first holding means comprising a non-flexible ring pivotably connected to said means for securing said holder to said belt for limited vertical swinging movement;
   said second holding means comprising a piece of flexible, expandable material having opposed first and second ends, front and back surfaces and opposite side edges, said aperture being adjacent the center of said piece of material and a slot longitudinally intermediate said aperture and said first end, whereby said piece of material is secured to said non-flexible ring by wrapping said piece of material around a portion of said ring and forcing and pulling said second end through said slot past the aperture.

2. The tool holder of claim 1 wherein said piece of material has two opposed slits longitudinally intermediate said aperture and said slot, said slits extending inwardly from said opposite side edges and parallel to said slot and defining an intermediate portion between said aperture and said slot, whereby when said second end is pulled through said slot, said slot and said slits cooperating to provide locking means for said second holding means about said non-flexible ring.

3. An article of manufacture in combination with a belt associated tool holder having a tool holding ring means which is adapted to loosely hold a tool, said article of manufacture being connectable to said tool holding ring means for further securement of a tool in said tool holding ring means, said article comprising:
   a flexible, expandable piece of material having opposed first and second ends, front and back faces and opposite side edges, said piece of material having a portion with an aperture therethrough and a slot located inwardly of both said side edges and spaced longitudinally between said aperture and said first end, whereby said piece of material is attached to said tool holding ring means by wrapping the piece of material about said ring means and forcing said second end through said slot and pulling said second end and said apertured portion of said piece through said slot;

said piece of material further having opposed slits respectively slit extending inwardly from said side edges and located longitudinally intermediate said aperture and said slot, wherein when said material is secured to said tool holding ring means, said slot and said slits cooperate to form locking means and said aperture is expandable about a portion of a tool to be secured.

4. The article of claim 3 wherein said slot has opposite ends, the inward extent of said slits respectively being longitudinally planar with the opposite ends of said slot.

5. The article of claim 3 further having at least one rivet hole located longitudinally between said slits and said slot.

6. The article of claim 3 wherein the material is taken from the group consisting of rubber and neoprene.

* * * * *